US011256018B2

(12) United States Patent
Defever et al.

(10) Patent No.: US 11,256,018 B2
(45) Date of Patent: Feb. 22, 2022

(54) LIGHT ASSEMBLY INCLUDING AN ILLUMINATING UTILITY SEGMENT AND A VISUAL STIMULANT SEGMENT

(71) Applicant: VARROC LIGHTING SYSTEMS, S.R.O., Senov U Noveho Jicina (CZ)

(72) Inventors: Derrick Defever, Royal Oak, MI (US); Glenn McCarter, Ann Arbor, MI (US); Dylan Schickel, Belleville, MI (US)

(73) Assignee: VARROC LIGHTING SYSTEMS, S.R.O, Senov U Noveho Jicina (CZ)

(*) Notice: Subject to any disclaimer, the term of this patent is extended or adjusted under 35 U.S.C. 154(b) by 0 days.

(21) Appl. No.: 16/502,698

(22) Filed: Jul. 3, 2019

(65) Prior Publication Data

US 2021/0003765 A1 Jan. 7, 2021

(51) Int. Cl.
*F21V 8/00* (2006.01)
*G09F 13/18* (2006.01)

(52) U.S. Cl.
CPC .......... *G02B 6/0035* (2013.01); *G02B 6/005* (2013.01); *G02B 6/0051* (2013.01); *G02B 6/0055* (2013.01); *G09F 13/18* (2013.01)

(58) Field of Classification Search
CPC .. G02B 6/0035; G02B 6/0036; G02B 6/0043; G02B 6/0055; G09F 13/18
See application file for complete search history.

(56) References Cited

U.S. PATENT DOCUMENTS

| | | | | |
|---|---|---|---|---|
| 2,886,911 A * | 5/1959 | George | H01H 9/18 40/546 |
| 5,433,024 A * | 7/1995 | Lerner | G02B 6/007 362/613 |
| 5,786,665 A * | 7/1998 | Ohtsuki | G02B 6/0023 313/512 |
| 5,791,757 A | 8/1998 | O'Neil et al. | |
| 6,425,673 B1 | 7/2002 | Suga et al. | |
| 6,712,482 B2 | 3/2004 | Kawakami et al. | |
| 7,651,241 B2 | 1/2010 | Lee | |
| 7,654,721 B2 | 2/2010 | Okada | |

(Continued)

FOREIGN PATENT DOCUMENTS

| | | |
|---|---|---|
| CN | 108087833 A | 5/2018 |
| DE | 20019073 U1 | 2/2001 |

(Continued)

OTHER PUBLICATIONS

German Office Action for German Application No. 102020117357.1; dated Feb. 10, 2021; 10 Pages.

*Primary Examiner* — Rajarshi Chakraborty
*Assistant Examiner* — Nathaniel J Lee
(74) *Attorney, Agent, or Firm* — Cantor Colburn LLP

(57) ABSTRACT

A light assembly includes a core, a light source, and a functional layer. The core extends along a centerline, and includes a base end, a distal end, a first side spanning axially between the base and distal ends, and a second side opposite the first side and spanning axially between the base and distal ends. The second side includes an unbinding element axially extending partially between the base and distal ends. The light source is adapted to emit light rays into the core at the base end. The functional layer is laterally spaced from the first side, axially extends partially between the base and distal ends, and is axially aligned to the unbinding element.

18 Claims, 3 Drawing Sheets

(56) References Cited

U.S. PATENT DOCUMENTS

| | | | | |
|---|---|---|---|---|
| 8,033,706 | B1 | 10/2011 | Kelly et al. | |
| 8,454,214 | B2 | 6/2013 | Kazaoka | |
| 8,469,580 | B2 | 6/2013 | Chen | |
| 8,529,113 | B2 | 9/2013 | Brown et al. | |
| 8,789,991 | B2 | 7/2014 | Martin et al. | |
| 8,814,410 | B2 | 8/2014 | McCollum et al. | |
| 8,899,768 | B2 | 12/2014 | Liu et al. | |
| 8,960,977 | B2 | 2/2015 | Yang et al. | |
| 9,335,460 | B1 | 5/2016 | Zhou | |
| 9,851,067 | B2 | 12/2017 | Martinez et al. | |
| 9,891,460 | B2 | 2/2018 | Wu et al. | |
| 10,073,210 | B2 | 9/2018 | Jang et al. | |
| 2006/0044825 | A1 | 3/2006 | Sa | |
| 2006/0291240 | A1 | 12/2006 | Kim et al. | |
| 2008/0266863 | A1* | 10/2008 | Rinko .................. | G02B 6/0038 362/278 |
| 2009/0219734 | A1* | 9/2009 | Sawada .................. | G02B 6/006 362/616 |
| 2010/0147661 | A1* | 6/2010 | Takeda .................. | H01H 13/83 200/314 |
| 2011/0182084 | A1 | 7/2011 | Tomlinson | |
| 2011/0219648 | A1* | 9/2011 | James ................. | G09F 13/0409 40/546 |
| 2011/0234941 | A1 | 9/2011 | Gourlay | |
| 2011/0249939 | A1 | 10/2011 | Schmidt et al. | |
| 2012/0163027 | A1* | 6/2012 | Vissenberg ............ | G02B 6/005 362/612 |
| 2013/0016526 | A1 | 1/2013 | McCollum et al. | |
| 2014/0153285 | A1 | 6/2014 | Ezell | |
| 2014/0268873 | A1 | 9/2014 | Holman et al. | |
| 2015/0316227 | A1 | 11/2015 | Sahlin et al. | |
| 2016/0146420 | A1 | 5/2016 | Yang | |
| 2016/0356942 | A1 | 12/2016 | Cherekdjian et al. | |
| 2016/0370534 | A1 | 12/2016 | Liu et al. | |
| 2019/0018183 | A1* | 1/2019 | Ochi .................... | G02B 6/0061 |
| 2019/0072703 | A1 | 3/2019 | Ostlie et al. | |

FOREIGN PATENT DOCUMENTS

| | | | |
|---|---|---|---|
| DE | 102018119334 | A1 | 2/2019 |
| EP | 1898147 | A1 | 3/2008 |
| EP | 3211298 | A1 | 8/2017 |
| GB | 2537088 | B | 10/2016 |
| KR | 20080111786 | A | 12/2008 |
| KR | 20100038840 | A | 4/2010 |
| WO | 2013068679 | A1 | 5/2013 |
| WO | 2018072569 | A1 | 4/2018 |
| WO | 2018137313 | A1 | 8/2018 |
| WO | 2019037803 | A1 | 2/2019 |

* cited by examiner

LIGHT ASSEMBLY INCLUDING AN ILLUMINATING UTILITY SEGMENT AND A VISUAL STIMULANT SEGMENT

BACKGROUND

The present disclosure relates to a light assembly, and more particularly, to a light assembly including an illuminating utility segment and a visual stimulant segment.

Traditional light assembly include a light source and an optical structure configured to receive light rays from the light source and controllably direct the light rays out of the optical structure to perform a utilitarian function (e.g., illuminate an area). Known light assemblies that also include decorative features which do not serve the utilitarian purpose, incorporate separate structures and/or light sources to perform the decorative function. Unfortunately, all of this contributes toward complexity, increased costs, and less than ideal packaging. Enhancements to light assemblies with visually stimulating features is desirable.

SUMMARY

In one exemplary, non-limiting, embodiment of the present disclosure, a light assembly includes a core, a light source, and a functional layer. The core extends along a centerline, and includes a base end, a distal end, a first side spanning axially between the base and distal ends, and a second side opposite the first side and spanning axially between the base and distal ends. The second side includes an unbinding element axially extending partially between the base and distal ends. The light source is adapted to emit light rays into the core at the base end. The functional layer is laterally spaced from the first side, axially extends partially between the base and distal ends, and is axially aligned to the unbinding element.

In another embodiment, a light assembly includes first and second cores, an illuminating utility segment, first and second visual stimulant segments, and first and second light sources. The first core extends along a first centerline, and includes a base end, and first and second sides each extending axially outward from the base end. The second core extends along a second centerline, and includes a base end, and first and second sides each extending axially outward from the base end. The second core is at least in-part laterally adjacent to the first core. The illuminating utility segment includes a first axial portion of the first core, an unbinding element of the second side of the first core, and a functional layer laterally spaced from the first side of the first core. The first visual stimulant segment includes a second axial portion of the first core. The second visual stimulant segment includes at least a portion of the second core. The first light source is adapted to illuminate the first core at the base end of the first core. The second light source is adapted to illuminate the second core at the base end of the second core.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, a light assembly 20 is illustrated. The light assembly 20 is constructed to perform duel functions including, for example, providing a signaling function and providing an illuminated decorative feature. In one example, the light assembly 20 may be part of a vehicle and may include a signaling portion adapted to provide a lit signal, and a second illuminated portion configured to provide a visual stimulant such as a decoration or informative such as the display of a trademark, logo, or other branding. In another embodiment, the light assembly 20 may be a sub-component of a larger light assembly.

In other embodiments, or applications, of the light assembly 20, the light assembly 20 may be a headlight assembly, a daytime running light of white color, a turn indicator of amber or red color, a front position light of white or amber color, a marker light of white or amber color, a front parking light of white color, a tail light of red color, a stop light of red color, a high mount stop light (HMSL) of red color, and/or a side marker of white, amber or red color. In yet other embodiments, the light assembly 20 may be a component, or a subsystem, of an automotive lamp assembly adapted to be mounted to a vehicle.

Figure 1:
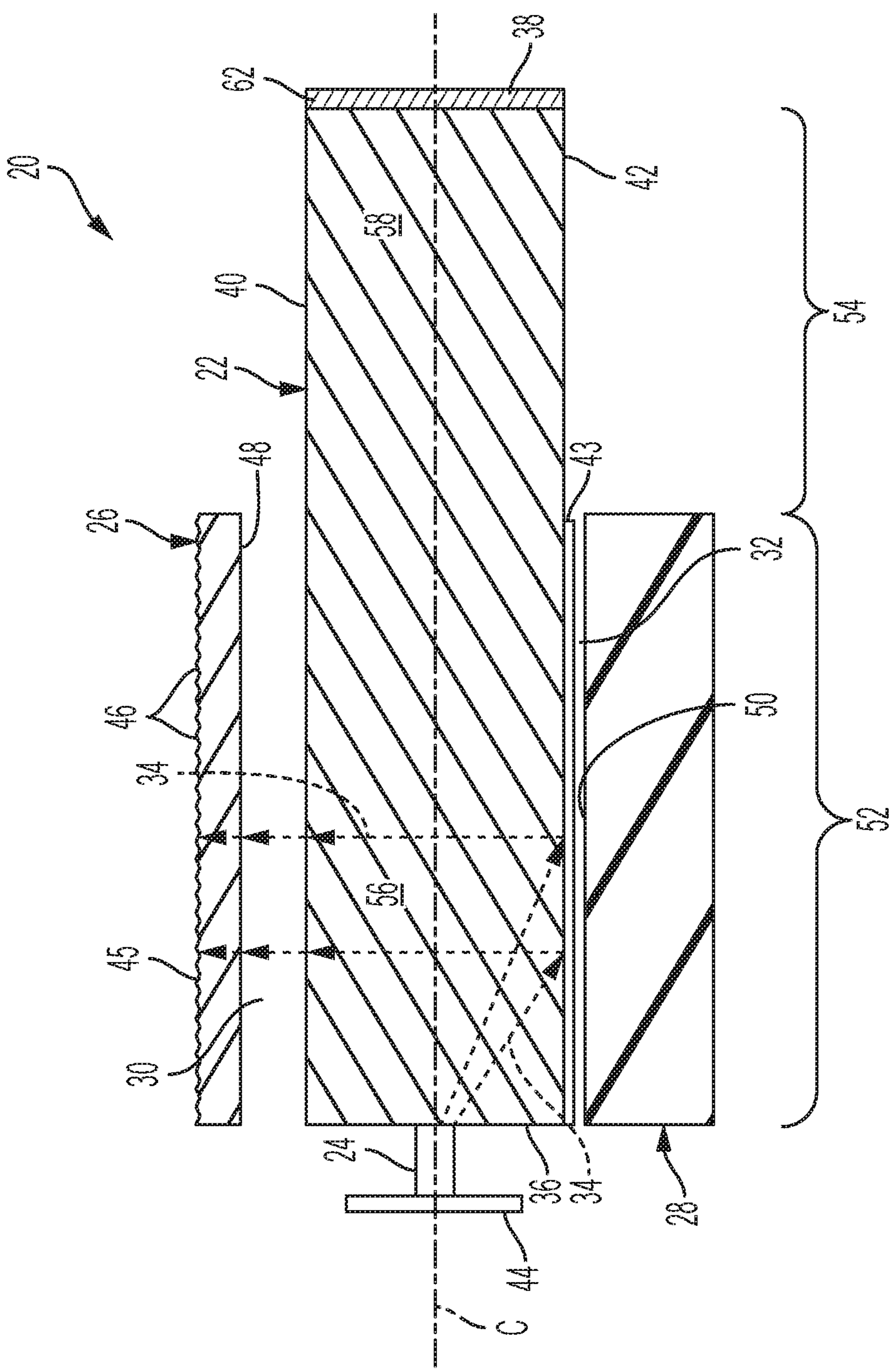
FIG. 1 is a cross section of a light assembly as one, non-limiting, exemplary embodiment of the present disclosure.

Referring to FIG. 1, the light assembly 20 may include a light conductive core 22 extending along a centerline C (i.e., optical axis), a light source 24, a functional layer 26, a reflector 28, a front technological layer 30, and a back technological layer 32. The core 22 is constructed to internally transmit and emit light rays 34, and may include a base end 36, a distal end 38, a first, or front, side 40, and a second, or back, side 42. The front and back sides 40, 42 span, and may form into the base and distal ends 36, 38. The core 22 is made of an optically transparent material such as a transparent polymer. Examples of a transparent polymer may include Polymethylmethacrylate (PMMA), Polycarbonate (PC), Cyclic Olefin co-polymer (COP), and any other suitable transparent polymer.

The back side 42 of the core 22 may generally include unbinding elements 43 constructed to re-direct the light rays 34 toward the front side 40 of the core 22. The distribution and size of the unbinding elements 43 are designed with respect to the shape of the desired active surface of the light assembly 20. In one example, the unbinding elements 43 may be produced by digital printing a portion of the back side 42, and in another embodiment by sandblasting a portion of the back side 42.

The light source 24 of the light assembly 20 may be located at the base end 36 of the core 22 and is adapted to generate and transmit the light rays 34 through the base end 36 and into the core 22. In one example, the light source may be one or more light emitting diodes (LEDs) mounted to a printed circuit board (PCB) 44 supported by a frame of the light assembly (not shown).

The functional layer 26 of the light assembly 20 is constructed to generally constrain the light rays 34 emitted from the core 22 towards a predetermined direction and distribution as required to provide the light distribution for the desired optical function. This predetermined direction may be normal to, or angled with respect to, an outer surface 45 (i.e., active surface) of the functional layer 26. To accomplish this, the functional layer 26 may include a plurality of optic features 46 (e.g., structures, serrations, or textures) carried, for example, by the outer surface 45 of the functional layer 26. In one example, the functional layer 26 may be adapted for homogenization of the emitted light rays 34. The optic features 46 may be formed integrally with their parent component (i.e., functional layer 26) or may be added using well known secondary processes such as vacuum coating, ink jet, screen, or gravure printing, or additive manufacturing. The light rays 34, to some degree, are directionally controlled, rather than being fully diffused or randomly spread. Generally, the effect of the functional layer 26 is to constrain most of the light rays 34 to within a box-like region within about twenty degrees of a predetermined direction.

The functional layer 26 may be laterally spaced from the front side 40 of the core 22, axially extends only partially between the base and distal ends 36, 38 of the core 22, and is generally aligned to the unbinding element(s) 43. For example, the functional layer 26 is co-axially aligned with the unbinding element 43 and along centerline C. In one embodiment, the functional layer 26 begins at the base end 36, and projects axially toward the distal end 38 of the core 22 but terminates before reaching the distal end 38 as illustrated in FIG. 1.

The front technological layer 30 of the light assembly 20 is adapted for refraction of the light rays 34, and preferably has a low refractive index relative to the optical core 22. The front technological layer 30 may be an air layer (i.e., air gap), may be or includes an adhesive with a low refractive index, or any other construction that sufficiently provides for refraction of the light rays 34 exiting the optical core 22. If the front technological layer 30 is an adhesive, the adhesive facilitates the connection of the core 22 to the functional layer 26. In one embodiment, the light assembly 20 may include several alternating functional and technological layers (26, 30) (i.e., sandwiched layers).

The front technological layer 30 is located directly between the front side 40 of the core 22 and an inner surface 48 of the functional layer 26. The layer 30 extends only partially between the base and distal ends 36, 38 of the core 22, and is axially aligned with the functional layer 26.

The reflector 28 of the light assembly 20 is constructed to reflect light rays 34 emitted through the back surface 42 of the core 22, and back into the core. The reflector 28 may have a highly reflective property, preferentially formed integrally, and it may include a foil, spray coating, adhesive, surface finish, or a combination thereof to enhance the reflective property.

The reflector 28 of the light assembly 20 may be laterally spaced from the back side 42 of the core 22, axially extends partially between the base and distal ends 36, 38, and is generally aligned to the unbinding elements 43. For example, the reflector 28 is co-axially aligned with the unbinding elements 43, and along centerline C. In one embodiment, the reflector 28 begins at the base end 36, and projects axially toward the distal end 38 of the core 22.

The back technological layer 32 of the light assembly 20 is adapted for refraction of the lights rays 34, and preferably has a low refractive index relative to the optical core 22. The back technological layer 30 may be an air layer (i.e., air gap), may be or includes an adhesive with a low refractive index, or any other construction that sufficiently provides for refraction of the light rays exiting the optical core 22. If the back technological layer 32 is an adhesive, the adhesive facilitates the connection of the core 22 to the reflector 28.

The back technological layer 32 is located directly between the back side 42 of the core 22 and an inner face 50 of the reflector 28. The back technological layer 32 extends only partially between the base and distal ends 36, 38 of the core 22, and is axially aligned with the functional layer 26 and the reflector 28.

With continued reference to FIG. 1, the light assembly 20 includes an illuminating utility segment 52 and a visual stimulant segment 54. In one embodiment, the utility segment 52 is constructed to provide a lit signal serving a technical function of the light assembly 20. For example, the utility segment 52 may perform the function of a vehicle stop lamp. In other applications, the utility segment 52 may be a daytime running light, a turn indicator, a front position light, a front parking light, a tail light, a high mount stop light (HMSL), and/or a side marker.

The visual stimulant segment 54 of the light assembly 20 may facilitate a decorative visual effect that may be visually pleasing but does not necessarily perform a utility function. That is, the visual stimulant segment 54 is part of the light assembly but does not specifically perform the function of the utility segment 52 (i.e., a stop lamp, a daytime running light, a turn indicator, a front position light, a front parking light, a tail light, a high mount stop light (HMSL), or a side marker).

The utility segment 52 may include a first portion 56 of the core 22, the unbinding element 43, the functional layer 26, the reflector 28, the front technological layer 30, and the rear technological layer 32. All of these components co-extend axially with respect to the centerline C. The visual stimulant segment 54 does not include and is not axially co-extend with the unbinding element 43, the functional layer 26, the reflector 28, the front technological layer 30, and the rear technological layer 32 of the utility segment 52. The visual stimulant segment 54, however, includes a second portion 58 of the core 22, and may further include a visual stimulant element 60 and, optionally an optical structure 62 (see FIG. 2, e.g., reflector). The second portion 58 extends axially from and forms into the first portion 56 of the core 22. Generally, the front and back sides 40, 42 may be substantially smooth and transparent, and may generally not transmit light rays 34 out of the core 22 except at the visual stimulant element 60.

The visual stimulant element 60 is preferably constructed to refract light out of the core 22 and thereby illuminate or glow for a visual effect. The element 60 may, for example, be a trademark on display, or any other form of decoration. In one example, the visual stimulant element 60 may be an engraving, engraved into the front or back sides 40. 42 of the core 22 at the second portion 58. In other non-limiting examples, the element 60 may be printed on one of the sides 40, 42, may be spaced between the sides 40, 42 or located inside the second portion 58, or may be a three-dimensional structure (i.e., sculpture) formed, or defined, by the sides 40, 42 and distal end 38.

Figure 2:
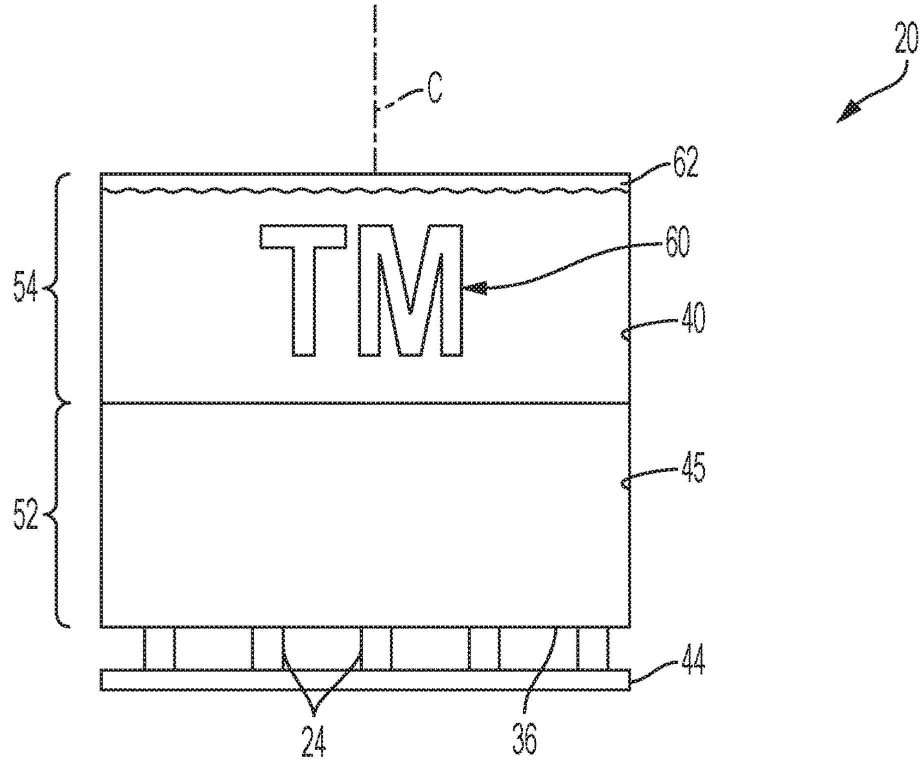
FIG. 2 is a front view of the light assembly.

Referring to FIGS. 1 and 2, and in one embodiment, the utility segment 52 of the light assembly 20 may include the base end 36 of the core 22, is directly adjacent to the light source 24, and spans axially between the light source 24 and the visual stimulant segment 54. In this embodiment, the optical structure 62 may be adjacent to (e.g., adhered to or manufactured integrally with) the distal end 38 of the core 22, and is adapted to emit some light rays 34 outward in a predetermined pattern for visual effect.

Figure 3:
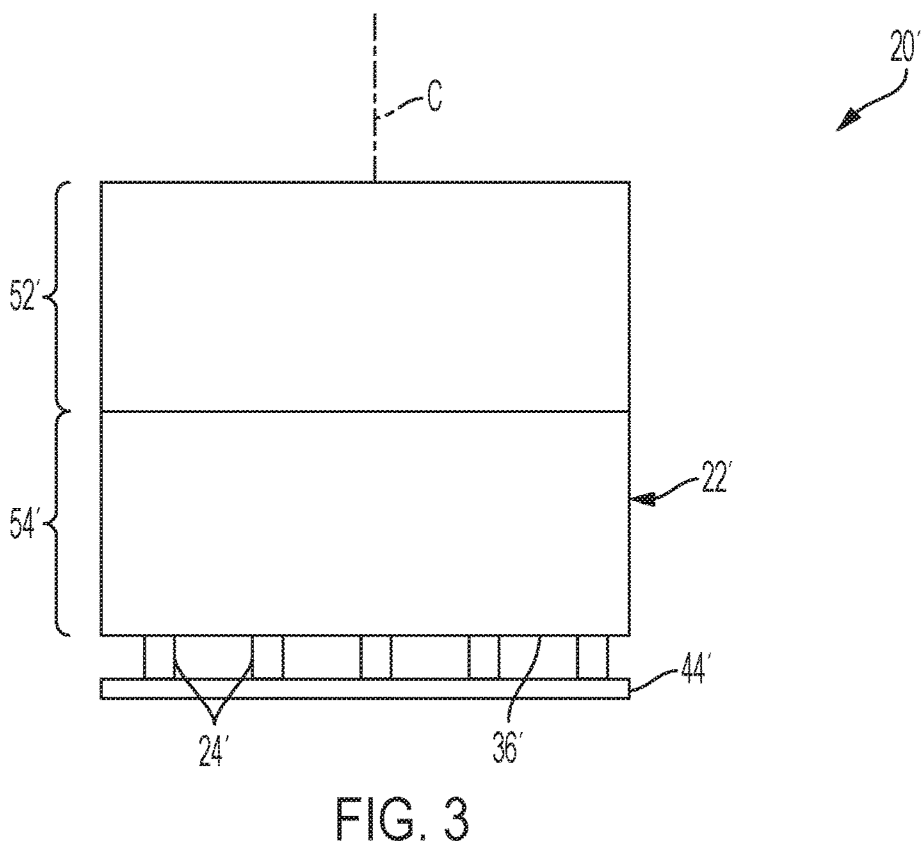
FIG. 3 is a front view of a second embodiment of a light assembly.

Referring to FIG. 3, and in another embodiment, like elements to the first embodiment of the light assembly have like identifying numerals except with the addition of a prime symbol as a suffix. FIG. 3 illustrates a light assembly 20' wherein a visual stimulant segment 54' of the light assembly 20' includes a base end 36' of a core 22', is directly adjacent to a light source 24', and spans axially between the light source 24' and a utility segment 52' of the light assembly 20'. In this embodiment, the visual stimulant segment 54' may not include visual stimulant element. Instead, the visual stimulation of the visual stimulant segment 54' is the appearance of the utility segment 52' floating in mid-space without a visually detectable support structure. That is, the visual stimulant segment 54' does not refract any light rays out of the core 22'. Alternatively, a construction of a light assembly 20 as explained above and illustrated in FIG. 3 can be conceived to include an isolated stimulant element similar to element 60 (see FIG. 2) within segment 54' (FIG. 3). Such a construction would still provide a floating appearance of the utility segment while also providing a desirable visual effect.

Figure 4:
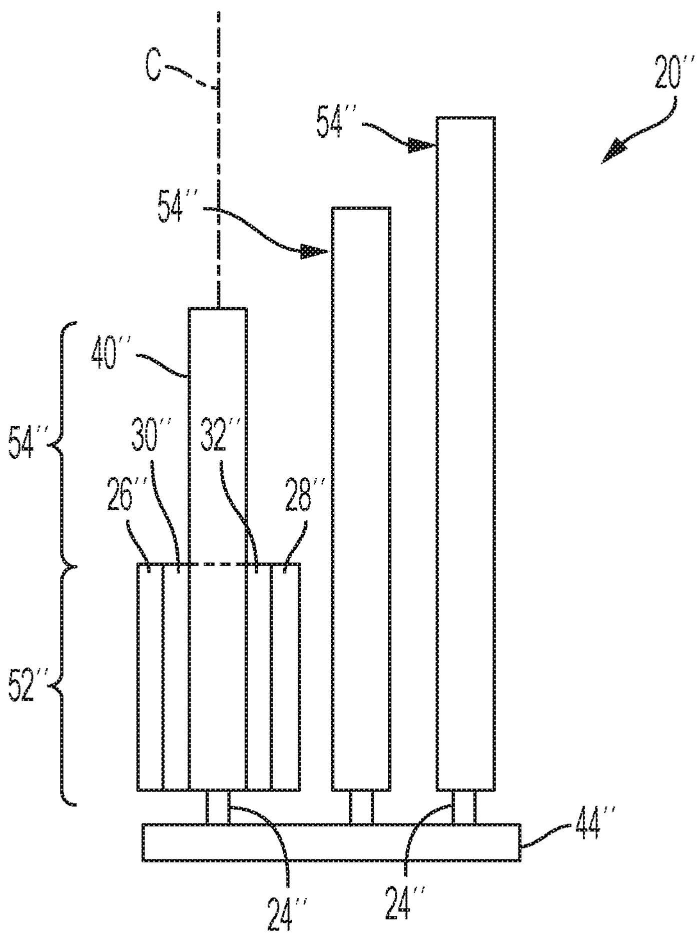
FIG. 4 is a side view of a third embodiment of a light assembly.

Referring to FIG. 4, a third embodiment of a light assembly is illustrated wherein like elements to the first embodiment have like identifying numerals except with the addition of a double prime symbol suffix. The light assembly 20" includes a utility segment 52", a plurality of visual stimulant segments 54" laterally aligned to one-another (i.e., co-extending axially with respect to a centerline C), a plurality of light sources 24", and a common PCB 44".

The utility segment 52" may generally project axially outward from a first light source 24", and a first stimulant segment 54" may project axially outward from the utility segment 52". The remainder of the plurality of visual stimulant segments 52" may be laterally aligned behind the first stimulant segment 54" with each successive stimulant segment 54" projecting axially further outward than the adjacent forward stimulant segment 54". Each one of the plurality of light sources 24" may be electrically attached to the common PCB 44". As a decorative feature, each light source 24" may be of a different color and/or characteristic.

It is further contemplated and understood that any combination and numbers of utility segments 52 and stimulant segments 54 may be aligned and orientated axially to one another. For example, a single light assembly may have a utility segment that spans axially between two adjacent stimulant segments.

Advantages and benefits of the present disclosure include the enhancement of the appearance of motor vehicle lighting with unlimited, integratable, options that does not require independent light sources. Other advantages include enhanced lighting requiring less packaging space, a reduction in complexity, and a reduction in cost.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A light assembly comprising:

a core extending along a centerline, the core including a base end, a distal end, a first side spanning axially between the base and distal ends, and a second side opposite the first side and spanning axially between the base and distal ends, the second side including an unbinding element axially extending partially and continuously between the base and distal ends;

a light source adapted to emit light rays into the core at the base end, wherein the distal end is distal from any light source; and a functional layer laterally spaced from and not attached to the first side, axially extending partially between the base and distal ends, and axially aligned to the unbinding element and coextends with the entire axial length of the unbinding element, wherein the unbinding element is directly adjacent to the base end and axially spaced from the distal end.

2. A light assembly comprising:

a core extending along a centerline, the core including a base end, a distal end, a first side spanning axially between the base and distal ends, and a second side opposite the first side and spanning axially between the base and distal ends, the second side including an unbinding element axially extending partially and continuously between the base and distal ends, wherein the unbinding element is directly adjacent to the base end and axially spaced from the distal end;

a light source adapted to emit light rays into the core at the base end;

a functional layer laterally spaced from and not attached to the first side, axially extending partially between the base and distal ends, and axially aligned with the unbinding element; and a reflector laterally spaced from the second side, axially extending only partially between the base and distal ends, and axially aligned to the unbinding element.

3. The light assembly set forth in claim 2, further comprising:

a first technological layer disposed directly between the first side and the functional layer, extending partially between the base and distal ends, and being co-axial with the functional layer; and a second technological layer disposed directly between the unbinding element and the reflector, extending partially between the base and distal ends, and being co-axial with the reflector.

4. The light assembly set forth in claim 3, wherein the unbinding element, the functional layer, and the reflector are directly adjacent to the base end.

5. The light assembly set forth in claim 3, wherein the functional layer includes optic features.

6. The light assembly set forth in claim 3, wherein the reflector includes a reflective layer.

7. The light assembly set forth in claim 3, further comprising:

an illuminating utility segment including a first portion of the core, the unbinding element, the functional layer, the reflector, the first technological layer, and the second technological layer; and a visual stimulant segment including a second portion of the core, wherein the second portion is not axially aligned to, and is not blocked by, the unbinding element, the functional layer and the reflector.

8. The light assembly set forth in claim 7, wherein the second portion extends axially from the first portion.

9. The light assembly set forth in claim 8, wherein the first and second sides at the second portion are substantially smooth and transparent.

10. The light assembly set forth in claim 9, further comprising:

a visual stimulant element carried by the second portion and adapted to refract light.

11. The light assembly set forth in claim 10, wherein the visual stimulant element is defined by one of the first and second sides.

12. The light assembly set forth in claim 10, wherein the visual stimulant element is spaced between the first and second sides, and is located inside the second portion.

13. The light assembly set forth in claim 7, further comprising:

a second core spaced laterally from the core and including a second visual stimulant segment at least in-part axially aligned to the visual stimulant segment.

14. A light assembly comprising:

a first core extending along a first centerline, the first core including a base end, a distal end, and first and second sides, wherein the first and second sides each extend axially to and between the base end and the distal end;

a second core extending along a second centerline, the second core including a base end, a distal end, and first and second sides, wherein the first and second sides each extend axially to and between the base end and the distal end, wherein the second core is at least in-part laterally adjacent to the first core;

an illuminating utility segment including a first axial portion of the first core having the base end of the first core, an unbinding element of the second side of the first core, and a functional layer laterally spaced from the first side of the first core;

an uncovered first visual stimulant segment including a second axial portion of the first core projecting axially outward from the first axial portion and toward the distal end, wherein the unbinding element and the functional layer are axial offset and spaced from the uncovered first visual stimulant segment;

an uncovered second visual stimulant segment including at least a portion of the second core and including the distal end of the second core, and projecting axially further outward than the second axial portion of the first core;

a first light source adapted to illuminate the first core at the base end of the first core; and a second light source adapted to illuminate the second core at the base end of the second core, wherein the first visual stimulant segment is in-part coaxially aligned to the second visual stimulant segment.

15. The light assembly set forth in claim 14, wherein the first and second light sources are of different colors.

16. The light assembly set forth in claim 14, further comprising:

a printed circuit board including the first and second light sources.

17. The light assembly set forth in claim 14, wherein the base ends of the first and second cores are substantially axially aligned and the second core projects axially outward further than the first core.

18. The light assembly set forth in claim 14, wherein the illuminating utility segment is adjacent to the base end of the first core.

* * * * *